United States Patent [19]

Cooper et al.

[11] 3,891,554
[45] June 24, 1975

[54] SELF CONTAINER TOILET AND SEWAGE TREATMENT UNIT

[76] Inventors: Carlos M. Cooper, Lake Forest, Bonner Springs, Kans. 66012; Francis M. Gladson, Jr., 2432 South 63rd Ter., Kansas City, Kans. 66104

[22] Filed: Mar. 12, 1974

[21] Appl. No.: 450,303

[52] U.S. Cl. ............... 210/152; 210/176; 210/270
[51] Int. Cl.² ........................................ B01D 35/02
[58] Field of Search ........... 210/152, 195, 196, 197, 210/220; 4/12

[56] References Cited
UNITED STATES PATENTS

| 3,419,146 | 12/1968 | Koulovatos | 210/152 X |
| 3,510,000 | 5/1970 | Carlson | 210/152 |
| 3,701,426 | 10/1972 | Wetzel | 210/152 |
| 3,738,489 | 6/1973 | Kraemer | 210/152 X |
| 3,824,632 | 7/1974 | Bach | 4/12 |

*Primary Examiner*—John Adee
*Attorney, Agent, or Firm*—Schmidt, Johnson, Hovey & Williams

[57] ABSTRACT

A self-contained toilet and sewage treatment unit is particularly adapted for use in connection with marine craft or the like or in other situations in which it is not practical or possible to provide a hookup to an exterior or remote sewage-receiving and disposal system. The unit is comprised of a container having a supply of water therein and is divided into three compartments each of which contain a portion of the water with a first sewage-receiving compartment defining an aeration chamber having a macerator to disintegrate the solid waste as it is received in the compartment for decomposition by bacterial action. A second compartment, in flow communication with the aeration chamber, defines a settling chamber and is provided with an airlift pump for returning settled sludge to the aeration chamber for further processing while the clarified liquid is directed through a charcoal filter disposed in the third compartment which defines a holding chamber for the liquid filtrate that is available for recycling into the first sewage-receiving compartment as required. Other filters are provided in the aeration chamber and the settling chamber to assist in separating the solid waste from the water in order that it might be returned to the aeration chamber for eventual decomposition.

18 Claims, 4 Drawing Figures

PATENTED JUN 24 1975  3,891,554
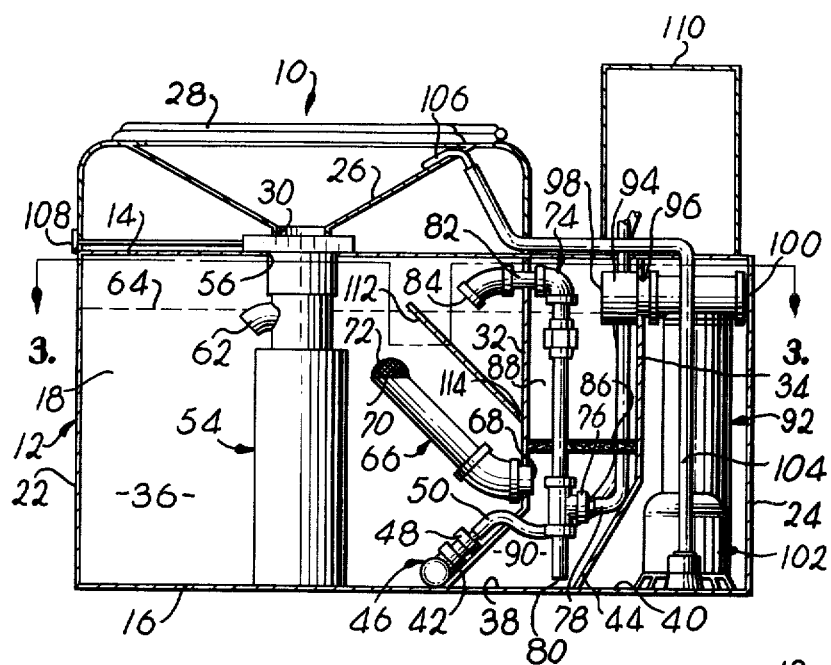
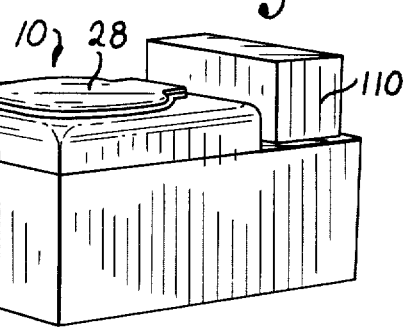
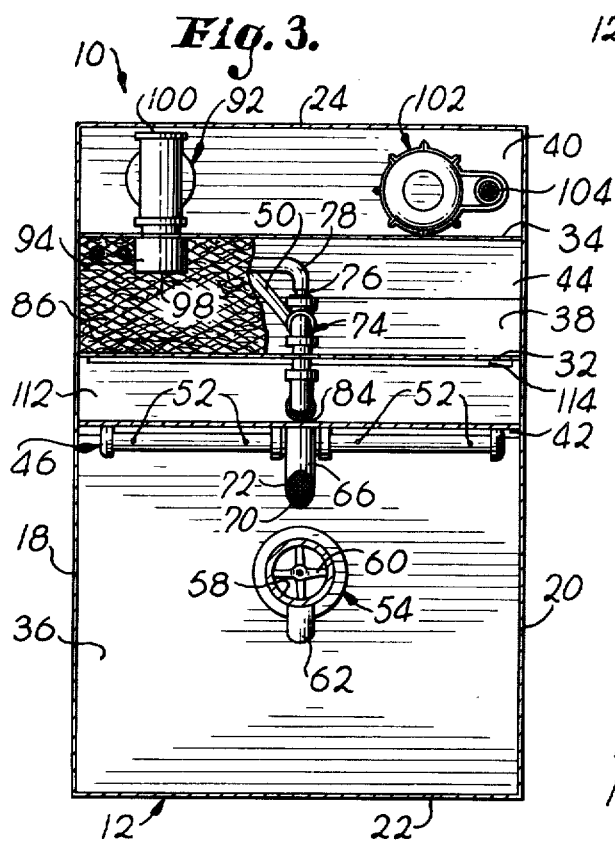
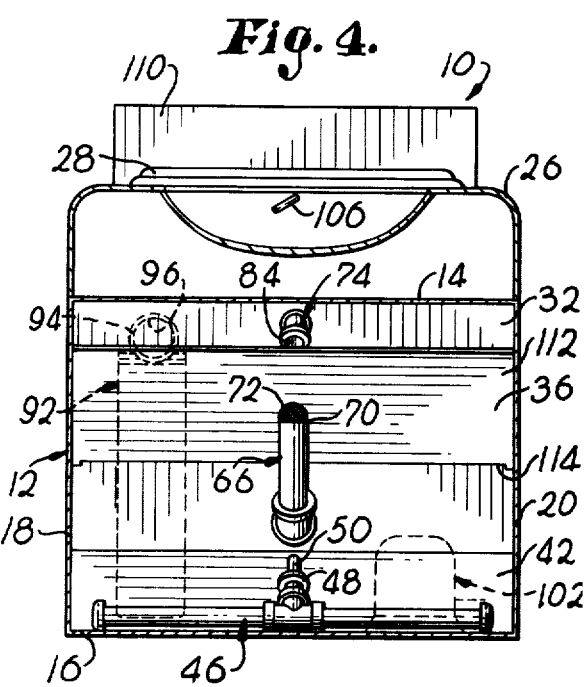

SELF CONTAINER TOILET AND SEWAGE TREATMENT UNIT

This invention relates to a sewage-receiving and treatment unit which is self-contained and does not rely on either an outlet or remote source of water but rather is capable of purifying the water therein for repeated reuse. Sewage treatment units of this type are particularly adapted and suited for use in boats which do not normally have an unlimited supply of water and in which proper sewage disposal has traditionally been a problem notwithstanding the inherent environmental pollution consequences.

It is, therefore, a very important object of our invention to provide a self-contained toilet and sewage treatment unit which overcomes the aformentioned inherent sewage treating and disposal problems in boats or the like.

A further very important object of this invention is to provide a sewage treatment unit which contains its own reusable water supply and, in connection therewith, the means for purifying the supply of water prior to recycling through the unit.

Yet another significant object of the invention is to provide a sewage treatment unit in which the water and sewage mixture is processed through a series of chambers, each of which successively remove increasingly smaller solid waste particles from the water until substantially purified water is received in a holding chamber for subsequent reuse.

Still another object of the present invention is to provide a macerator that disintegrates the solid waste as it is received in an aeration chamber, thus speeding up the process of breaking down the waste material by bacterial action.

Yet another object of the invention is to provide a sewage treatment unit which does not require any external connections other than that needed to tap a source of electricity and a source of pressurized air for operation of the unit.

In the drawing:

FIG. 1 is a perspective view showing the front, one side, and the top of a self-contained toilet and sewage treatment unit made pursuant to the present invention;

FIG. 2 is an enlarged, vertical, longitudinal, cross-sectional view revealing internal details of construction;

FIG. 3 is a horizontal, cross-sectional view taken along irregular line 3—3 of FIG. 2; and FIG. 4 is a vertical, transverse, cross-sectional view taken through the aeration chamber and with the macerator removed.

A self-contained toilet and sewage treatment unit, broadly identified by the numeral 10, is particularly adapted for use in connection with marine craft having need for such facilities, but is not necessarily limited to use in such craft and may be utilized, as for example, in connection with motor homes or the like, or in other situations where conventional sewage-receiving and treating facilities are not readily available.

Broadly, the unit 10 is comprised of a cabinet-like container 12 adapted to receive a supply of water therein and having a top wall 14, a bottom wall 16, sidewalls 18 and 20, a front wall 22, and a rear wall 24. Superimposed over the top wall 14 is a toilet bowl 26 provided with a seat and lid assembly 28 and a sewage outlet 30.

A pair of upright, transverse divider walls 32 and 34, spaced longitudinally along the container 12 interiorly thereof, divide the same into three compartments 36, 38 and 40 which define an aeration chamber, a settling chamber, and a holding chamber respectively. The walls 32 and 34 each include a forwardly and downwardly sloping lower section 42 and 44 respectively, the purposes of which will be made more clear hereafter.

The aeration chamber or first compartment 36 has disposed therein a pressurized air-circulating means in the form of an elongated header or pipe 46 extending transversely of the container 12 adjacent the bottom wall 16 thereof just forwardly of the lower section 42 of the divider wall 32. The header 46 is operably coupled, through the use of appropriate fittings 48 and a flexible air line 50 which passes through the section 42, to a source of pressurized air (not shown) and is provided with a plurality of air escape orifices 52. The orifices 52 are arranged longitudinally along the header 46 to permit the air to discharge in an upward direction for circulation throughout the water in the chamber 36 and thus release oxygen in order to support the bacterial action required to decompose the waste material.

A submersible macerator 54, positioned within the chamber 36, extends upwardly through an opening 56 in the top wall 14 and has an inlet 58 in direct communication with the sewage outlet 30 of the vessel 26. The electrically powered macerator 54 includes a set of rotatable, material pulverizing blades 60 disposed to process the solid waste as it enters the macerator 54 prior to the material being discharged into the chamber 36 through a forwardly facing discharge opening 62 located below the normal level of the sewage and water mixture in the chamber 36; the normal mixture level being indicated by the dotted line in FIG. 2 and identified by the numeral 64.

In order for the settling chamber 38 to be in flow communication with the aeration chamber 36, an elongated conduit or pipe assembly 66 is suitably secured to the divider wall 32 and extends therethrough such that an outlet end 68 of the pipe assembly 66 is disposed just above the sloping section 42 of the wall 32. The conduit 66 angles upwardly and forwardly into the chamber 36 and terminates in an inlet end 70 located beneath the level 64 of the sewage and water mixture but proximal thereto. A dome-shaped strainer screen 72, having perforations of a size that prevent relatively large, undissolved masses of waste material from entering the conduit 66, is affixed to the conduit 66 at the inlet end 70.

Located in the center compartment or settling chamber 38, which is defined by that space in the container 12 between the two divider walls 32 and 34, is a sludge transfer means in the form of a suction device 74 comprised of an upright pipe structure constructed of a series of pipe lengths and couplings in which a fitting 76 is operably interconnected with a source of pressurized air via an air line 78 in a manner similar to that of the header 46 in the aeration chamber 36. The airlift device 74 is of the kind well-known in the art of pneumatic conveying of material and will, therefore, not be detailed herein, but suffice it to say that pressurized air introduced into the device 74 at a point above a lower end 80 thereof and directed upwardly therethrough will cause material to be drawn into the device 74 through the end 80. The lower end 80 terminates just above the bottom wall 16 and proximal the lower section 44 of the rear divider wall 34 while the upper portion of the device 74 extends horizontally through an opening 82 near the top of the front divider wall 32 and terminates in a generally downwardly and forwardly projecting outlet 84 located just above the fluid level 64 in the aeration chamber 36.

Extending transversely across the chamber and between the walls 32 and 34 just above the conduit outlet 68 is a horizontally disposed scum filter 86 which divides the chamber 38 into an upper zone 88 and a lower zone 90. The filter 86 may be of any of the well-known, conventional kind in which a fibrous type material is sandwiched between a pair of expanded metal or screened side panels, it being understood that suitable apertures are provided in the filter 86 through which the device 74 as well as the air lines 50 and 78 pass.

Turning now to the rearwardmost compartment or holding chamber 40, attention is directed to the cartridge-type filter 92 placed therein and in communication with the settling chamber 38 by virtue of an extension fitting 94 extending through an opening 96 near the top of the rear wall 34. Referring to FIG. 2, it will be observed that an inlet end 98 of the filter 92 is so placed relative to the fluid line 64 that any rise in the level thereof will cause clarified liquid from the settling chamber 38 to flow into the filter 92. Further, an outlet 100 of the filter 92 is disposed adjacent the rear wall 24 near the top of the chamber 40. The filter 92 may be best described as being of the disposable, activated charcoal type which is particularly well-suited for removing sediment and other odor-producing particles from the water.

Also located in the holding chamber 40 is an electrically powered flush pump apparatus 102 for pumping the filtered water from the compartment 40 to the toilet bowl 26 via a tubing system 104 that terminates in a discharge nozzle 106 at the bowl 26. It is to be understood that proper circuitry is provided between the macerator 54, the flush pump 102, and a source of electrical power in order that these components (54 and 102) may be simultaneously actuated at the time a control lever 108 at the front of the unit 10 is shifted. A shroud or cover 110 is provided atop the upper wall 14 to protect the controls normally associated with the operation of the macerator 54 and the pump 102.

In use, assuming the proper electrical and air connections have been made, a supply of water is introduced into the container 12 to the extent that a liquid level is achieved throughout the three compartments 36-40 as indicated by the level line 64. It is to be understood that once the unit 10 has been placed into use there is a continual stream of air introduced into the aeration chamber 36 by the header 46 and its orifices 52 to cause a rolling action in the liquid by virtue of the air circulating upwardly therethrough. Likewise, there is a continual supply of air furnished to the airlift structure 74 for purposes which will be further clarified hereinbelow.

Assuming a quantity of human waste or sewage has been introduced into the unit 10 and the control lever 108 shifted to actuate the macerator 54 and the flush pump 102, the waste material is allowed to pass from the bowl 26 into the macerator 54 via the outlet 30 and inlet 58, respectively, for pulverization and subsequent discharge into the water in the aeration chamber 36. The particulate material is thoroughly mixed with the water in the chamber 36 and the aeration process takes place therein on a continual basis and, as the mixture circulates, the bacterial action causes the solid material to dissolve and flow from the chamber 36 into the settling chamber 38 via the conduit 66, it being noted that the screen 72 precludes the entry of any solid material which is not dissolved to the point that permits it to pass through the perforations thereof.

Once the mixture has passed into the settling chamber 38 the heavier particles settle to the bottom in the form of a sludge, and the airlift device 74 serves to convey the sludgy material back to the aeration chamber for further decomposition and recycling. Of course, this continual recycling of the sludgy material includes a circulation of the liquid between the two chambers 36 and 38 inasmuch as the reintroduction of material in the aeration chamber causes additional fluid interchange between the two chambers as the fluid seeks its own level; however, the disposition of the airlift device 74 permits the sludge to be removed from the chamber 38 without disturbing the clarification process taking place in the lower zone 90. In fact, as the sewage and water mixture flows into the settling chamber, clarified water is forced upwardly through the scum filter 86 as an inherent result of the fluid levels in the two chambers equalizing.

Thus, the aeration and settling process proceeds uninterruptedly with the clarified liquid generally being in the zone 88 above the scum filter 86. At those times that the flush pump 102 is actuated to draw water from the holding chamber 40 for transmittal to the bowl 26, the subsequent lowering of the water level in the chamber 40, along with the subsequent rise in the water level in the chambers 36 and 38, causes the clarified water to flow from the zone 88 into the filter 92 through the inlet 98, and eventually through the outlet 100 as the water seeks its own level throughout the container 12. Of course, in this process, the filter 92 has had a chance to further purify and deodorize the clarified liquid as the same passes therethrough and into the holding chamber 40. The dividing of the settling chamber 38 into the zones 88 and 90 by the filter 86 further aids in the clarification process by retaining the scum which might not immediately settle to the bottom of the chamber in the settling zone 90 until such time as it has coagulated to the point that it is conveyed back to the aeration chamber 36 by the device 74.

Attention is directed to a horizontal, upwardly and inwardly extending baffle 112 in the aeration compartment 36 which is secured to the forward face of the divider wall 32 and extends to a point just above the normal upper level 64 of the water. As is best seen in FIG. 2, the baffle 112 is in a position to be interposed between the outlet 84 of the airlift device 74 and the inlet end 70 of the conduit 66, thereby serving to deflect, away from the inlet 70, the material issuing from the device 74. In order to permit full circulation of the mixture in the compartment 36, and particularly that matter reintroduced thereinto, a transverse, elongated slot or drain aperture 114 is provided at the juncture of the baffle 112 with the wall 32 in order that the sludge and other particulate material may flow past the baffle and into the main stream of circulation.

The positioning of the header 46 is important to achieve the proper circulation of the liquid in the compartment 36, and for this reason, the header is placed somewhat forwardly of the primary upright plane of the wall 32. Thus, in order to avoid a "dead area" the wall 32 is provided with the forwardly and downwardly angled lower section 42. The forward angularity of the lower section 44 of the rear divider wall 34 affords adequate clearance for the flush pump 102 in the holding chamber 40.

From the foregoing it will be seen that a relatively simple, uncomplicated sewage-receiving and treating unit is presented which is completely self-contained other than for the required air and electrical hookups, thereby avoiding the need for external holding tanks and their attendant maintenance and purging requirements. Inasmuch as the aeration and filtering processes assist the bacterial action in breaking down the particulate waste material to the point that the sediment filter 92 essentially finalizes the purifying process of the water, the same may be continually recycled or reused without the need for introducing a new quantity or supply or water periodically other than that lost through normal evaporation and whatever relatively small amounts are removed with the cartridge whenever the filter 92 is serviced.

Not to be overlooked is the fact that the incorporation of the macerator 54 greatly enhances the rapid breakdown of the waste material and significantly aids in the bacterial decomposition process. Also, the sludge that is removed from the settling chamber 38 is aerated as it moves through the device 74, thus supplementing the aeration process in the chamber 36.

Having thus described the invention, what is claimed to be new and desired to be secured by Letters Patent is:

1. A self-contained toilet and sewage treatment unit comprised of:
   a container adapted for receiving sewage and having a supply of water therein,
   said container having a first sewage-receiving compartment containing a portion of said water with which the sewage mixes;
   means operable coupled with a source of pressurized air for introducing and normally continuously circulating a supply of air through the sewage and water mixture in said first compartment whereby the compartment defines an aeration chamber,
   said air introduction and circulation means including air discharge structure arranged in said compartment to direct and circulate air through the mixture such that the same is agitated with the sewage therein being in substantially complete suspension in the water at all times;
   a second compartment within said container in flow communication with said first compartment and defining a settling chamber for clarifying the sewage and water mixture therein;
   filtration means located within said container and in flow communication with said second compartment for receiving and removing from the clarified water substantially all sewage particles remaining therein;
   a third compartment within said container in flow communication with said filtration means for receiving the filtrate therefrom and defining a holding chamber for the filtered water; and
   recycling means disposed within said container and adapted for returning the filtered water from said third compartment to said first compartment on demand.

2. A unit as claimed in claim 1, wherein said container includes a toilet bowl having a bottom outlet, and wherein there is a macerator provided in said first compartment, said macerator being disposed to receive said sewage directly from said bowl outlet and to discharge the sewage directly into said first compartment for said mixing with the water therein.

3. A unit as claimed in claim 1, wherein a sludge transfer means disposed to empty into said first compartment is provided in said second compartment for conveying precipitated solid matter therein back to said first compartment for further aeration.

4. A unit as claimed in claim 1, wherein said filtration means is located within said third compartment, said filtration means having an inlet disposed in said second compartment and for receiving the clarified water from said second compartment, and a filtrate outlet disposed in said third compartment.

5. A unit as claimed in claim 4, wherein there is a scum filter in said second compartment disposed in the flow path of the clarified water as the same moves toward said filtration means inlet.

6. A unit as claimed in claim 4, wherein said recycling means includes a flush pump located in said third compartment.

7. A unit as claimed in claim 1, wherein there is an elongated conduit in said first compartment disposed to conduct said sewage and water mixture from said first compartment to said second compartment, said conduit having an inlet end normally disposed beneath the upper level of said mixture and proximal thereto and an outlet end in said second compartment.

8. A unit as claimed in claim 7, wherein said inlet end of said conduit is provided with a strainer screen having perforations of a predetermined size through which said mixture must pass.

9. A unit as claimed in claim 7, wherein said filtration means includes an inlet for said clarified water; and wherein there is provided a scum filter across said second compartment and interposed between said conduit outlet and the inlet of said filtration means such that the clarified water must pass through said filter prior to entering the inlet of said filtration means.

10. A unit as claimed in claim 7, wherein a sludge transfer means is provided in said second compartment for conveying precipitated solid matter therein back to said first compartment, said transfer means having an outlet in said first compartment located above the normal upper level of said mixture.

11. A unit as claimed in claim 10, wherein there is a baffle in said first compartment interposed between said sludge transfer means outlet and the inlet of said conduit whereby the returned sludge is deflected away from said conduit inlet.

12. A unit as claimed in claim 11, wherein said container includes a pair of opposed sidewalls and a plurality of internal divider walls dividing the container into said compartments, and wherein said baffle is horizontally disposed proximal a first divider wall defining said first and second compartments and extends transversely of said first compartment between said pair of sidewalls above said conduit, said baffle projection upwardly and inwardly into said first compartment at an angle to a point just above the normal upper level of said mixture.

13. A unit as claimed in claim 12, wherein there is at least one opening in said baffle adjacent said first divider wall to permit circulation of said mixture between the baffle and the divider wall.

14. A unit as claimed in claim 1 wherein said air discharge structure includes a plurality of air discharge orifices arranged across substantially the full transverse width of said compartment, said air discharge orifices being located to direct the air along a generally predetermined path of travel to agitate the water to develop a rolling movement of mixture in the compartment.

15. A unit as claimed in claim 14, wherein said air discharge structure includes an elongated, horizontally disposed header submerged in said liquid portion in the first compartment, said air discharge orifices being linearly located along said header to direct said air supply in a generally upwardly angled direction through said sewage and water mixture.

16. A self-contained toilet and sewage treatment unit including:
- a container having a supply of water therein for mixing with sewage deposited therein;
- an aeration chamber within said container in which sewage is received for mixing with a portion of said water supply and into which a supply of pressurized air is normally continuously introduced for circulation through the water and sewage mixture;
- means for normally continuously introducing a supply of pressurized air into said aeration chamber in a manner to circulate air through the mixture along a generally predetermined path of travel to develop a rolling movement of the mixture in the chamber;
- a macerator in said chamber disposed to process said sewage as the same is received in the chamber;
- a settling chamber in said container and in flow communication with said aeration chamber;
- means for conveying precipitated sewage sludge from said settling chamber back to said aeration chamber;
- a liquid reserve holding chamber in said container;
- flow thru filter means disposed in direct flow communication with said settling chamber to receive clarified water therefrom and having a filtrate outlet disposed to discharge water directly into said holding chamber; and
- means within said container for selectively recycling said water from said holding chamber to said aeration chamber on demand.

17. A unit as claimed in claim 16, wherein there is provided a prefilter being disposed across the flow path of the clarified liquid as the same flows to said filter means.

18. A unit as claimed in claim 17, wherein there is provided a perforated screen interposed in the flow path of the water and sewage mixture between said aeration chamber and said settling chamber for retaining any relatively large sewage particles in said aeration chamber.

* * * * *